Sept. 10, 1940.  H. HAUSEN  2,214,672

HEAT STORER

Filed Feb. 10, 1937

Inventor.
Helmuth Hausen
by
Potter, Pierce & Scheffler
his attorneys

Patented Sept. 10, 1940

2,214,672

UNITED STATES PATENT OFFICE 2,214,672

HEAT STORER

Helmuth Hausen, Solln., near Munich, Germany, assignor to Gesellschaft fur Linde's Eismaschinen A. G., Hollriegelskreuth, near Munich, Germany, a corporation of Germany Application February 10, 1937, Serial No. 125,124 In Germany March 26, 1936

2 Claims. (Cl. 62—175.5)

In the decomposition of gas mixtures by liquefaction and rectification it has been proposed to employ heat storers through which fresh gas and cold decomposition products are passed alternately. The fresh gas flowing through the heat storer imparts its heat to the storing material which in the next period is removed by the cold decomposition products flowing through the storer in the opposite direction.

The advantages of regenerators of this type reside in their good heat exchange properties, the slight fall in pressure of the gases passed through them, and particularly in the fact that preliminary removal from the fresh gas of constituents such as water vapor, carbon dioxide, etc., which are deposited as frost upon the heat storing material, is avoided. Such constituents deposited as frost from the fresh gas are vaporized and carried away by the decomposition products flowing through the storer when the operating conditions are properly adjusted.

Figure 1:
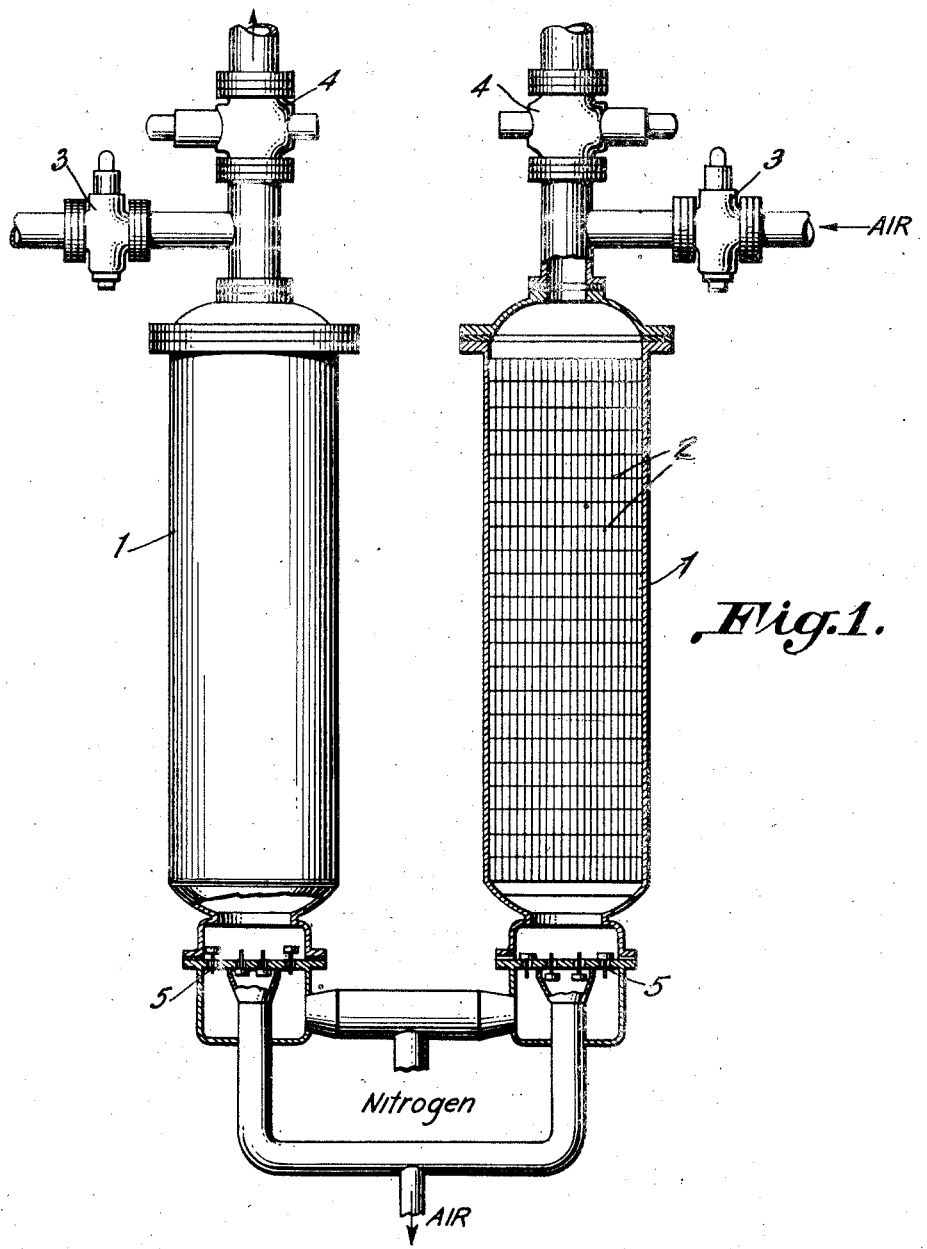

Figure 1 gives schematically a view partly in section of such a pair of heat storers as used for the exchange of heat between nitrogen and the main portion of air in connection with the separation of air by liquefaction and rectification according to Patent No. 2,048,076, to Linde.

Figure 2:
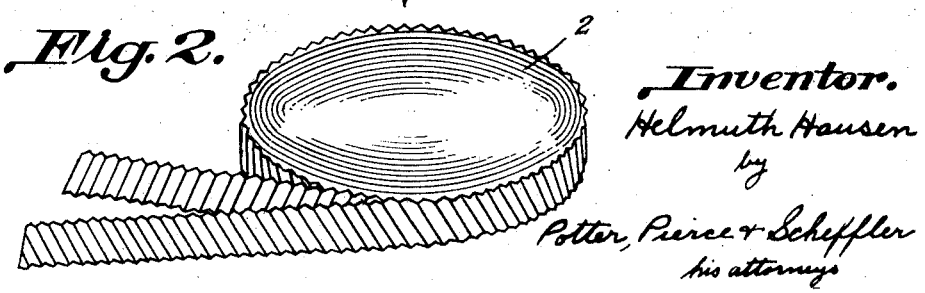

Figure 2 shows a layer of the heat storing material in the regenerator according to Figure 1.

It is customary to make the heat storers each in the form of a cylindrical vessel 1, containing layers 2 of wound up spirals of corrugated strips of the heat storing material as shown in Figure 2. In order to regulate the flowing direction of the gases the vessels are provided with regulating devices 3 and 4 operated by means of air pressure and at the lower ends of vessels 1, automatic valves or flaps 5 are arranged. In selecting the size or dimensions of the heat storer the following problems have been encountered. The heat exchange can be made as efficient as is desired by the provision of a large heat storing mass having a large contact surface, but in increasing the size or heat capacity of the storing mass one must consider not only the cost of the installation, but also the time required to bring the storer to operative condition upon starting up the operation of the apparatus after an interruption. It has been found that the optimum effects are produced if the following conditions are observed:

(1) The heat capacity of the storing material, measured in kilogram calories per degree Celsius, should be between 0.05 and 0.2 of the surface of the storing material measured in square meters.

(2) The product of the heating surface measured in square meters and the heat transfer factor of the mass must amount to at least one fifth of the quantity of heat in kilogram calories transferred, in the unit of time involved in the heat transfer factor, from the fresh gas or to the decomposition products.

If, for example, 10,000 cubic meters of air per hour are cooled down from room temperature to $-180°$ C., about 600,000 kilogram calories per hour are transferred from the fresh gas to the decomposition products. With a storing surface of 6,000 square meters, a heat transfer factor of at least 20 $KgCal/m^2h°$ C. (KgCal stands for kilogram calories, $m^2$ for the area of the heat storing material in square meters, $h$ for the time in hours, and °C. for the temperature change in degrees centigrade) is necessary for meeting condition (2). This value will be provided, for instance, by selecting the distance between the metal strips, wound into spirals, determined by the height or depth of the corrugations, so that a hydraulic diameter of between 1 mm. and 1 cm. results and the speed of the gas in the free cross-section between the strips will be one meter per second or greater.

The maintenance of these conditions permits a heat exchange of more than 98% with a fall of pressure in the gas which is consistently less than that in a tubular counterflow device of equal capacity and without encountering an objectionably long starting period due to the use of too large a heat storing mass.

When relatively slight differences in pressure between the fresh gas to be cooled and the decomposition products to be warmed exist, as, for instance, when blowing air into the upper column of a two-stage air decomposing apparatus, provision must be made to assure the sublimation of the frost or condensate deposited from the fresh gas. Since the condensation of vapors from the fresh gas occurs during the period in which the heat storer is warming up and at a higher temperature than that at which the condensate must be vaporized by the decomposition products during the period when the heat storer is being cooled down, the difference in volume between the fresh gas and the decomposition products, especially when there is only a slight difference in pressure between the two gases, generally is not sufficient to accomplish a complete sublimation of the condensate, due to the fact that the saturation partial pressure of the vaporized condensate in the decomposition gases is reduced by the lower vaporization temperature. For assuring a complete sublimation of the condensate, e. g. carbon dioxide, condensing at the cold end of the heat storer, it has been proposed to pass a larger amount of decomposition products than fresh gas through the storer. This method can be carried out without an objectionable loss of cold only when the specific heat of the fresh gas is so much greater than that of the decomposition products that it can absorb all of the cold contributed by the larger volume of decomposition gas. If, however, as in blowing air, according to, Lachmann German Patent No. 167,931, the difference in pressure amounts to only part of an atmosphere, there is practically no difference in heat content which would make it possible to use a substantially larger volume of the cold decomposition gases.

In accordance with the present invention this difficulty is overcome as follows: In addition to maintaining the conditions (1) and (2) set out above, the minimum value of the heat capacity of the heat storing material is made about 10 times, and at least 8 times the heat capacity of the amount of gas passed through the storer at each period. This ratio is about twice as large as appears to be necessary for heat exchange between gases at a relatively large difference in pressure. The increased heat capacity makes it possible, however, to reduce the difference in temperature in the heat exchange so much that complete sublimation of the condensate is assured. It has moreover been found to be advisable to base the selection of the storing material or mass in each succeeding zone upon the specific heat of said material and of the gases at the range of temperature encountered in said zones. The storing material is so selected that its heat capacity at the mean working temperature in each succeeding zone increases in correlation with the increase in the specific heat of the air at the respective low temperatures. In this way a drop in temperature as nearly as possible in a straight line is produced even though the specific heats of the gases and of the storing material vary with the temperature. This affords the most satisfactory condition for heat exchange and sublimation of condensate with reference to the temperature fluctuations in the storing material in each period of its operation.

I claim:

1. In a process for the decomposition of gases by liquefaction and rectification involving heat exchange between the gas to be rectified and the cold gaseous decomposition products thereof by the alternate passage of said gas and said gaseous decomposition products through a heat exchanger, the step which consists in causing the gas to flow through the heat exchanger at a rate and for a heat transfer period so chosen with respect to the thermodynamic characteristics of the gas and of the heat transfer mass that the amount of heat transferred to the gas from the heat transfer mass or vice versa in the period of time involved in the heat transfer factor measured in kilogram calories is less than five times the product of the heat transfer surface measured in square meters and the heat transfer factor between the gas and the heat transfer mass.

2. In a process for the decomposition of gases by liquefaction and rectification involving heat exchange between the gas to be rectified and the cold gaseous decomposition products thereof by the alternate passage of said gas and said gaseous decomposition products through a heat exchanger, the step which consists in causing the gas to flow through the heat exchanger at a rate and for a heat transfer period so chosen with respect to the thermodynamic characteristics of the gas and of the heat transfer mass that the heat capacity measured in kilogram calories of the gas passed through the heat exchanger within each period is not greater than one-eighth of the heat capacity of the heat transfer mass measured in kilogram calories.

HELMUTH HAUSEN.